(12) United States Patent
Bouvier et al.

(10) Patent No.: US 9,061,918 B2
(45) Date of Patent: Jun. 23, 2015

(54) METHOD OF MAKING LSX ZEOLITE OF CONTROLLED PARTICLE SIZE

(75) Inventors: Ludivine Bouvier, Billere (FR); Serge Nicolas, Lons (FR); Guy-Henri Durand, Gonneville sur Honfleur (FR)

(73) Assignee: CECA S.A., La Garenne Colombes (FR)

( * ) Notice: Subject to any disclaimer, the term of this patent is extended or adjusted under 35 U.S.C. 154(b) by 410 days.

(21) Appl. No.: 12/744,806

(22) PCT Filed: Dec. 16, 2008

(86) PCT No.: PCT/FR2008/052315
§ 371 (c)(1),
(2), (4) Date: Jun. 10, 2010

(87) PCT Pub. No.: WO2009/081022
PCT Pub. Date: Jul. 2, 2009

(65) Prior Publication Data
US 2010/0304140 A1    Dec. 2, 2010

(30) Foreign Application Priority Data

Dec. 20, 2007 (FR) ..................................... 07 60080

(51) Int. Cl.
*C01B 33/06* (2006.01)
*C01B 33/26* (2006.01)
*C01B 39/22* (2006.01)
*B01J 20/18* (2006.01)

(52) U.S. Cl.
CPC ........... *C01B 39/22* (2013.01); *Y10T 428/2982* (2015.01); *B01J 20/18* (2013.01)

(58) Field of Classification Search
USPC .................. 423/710, 711, 718, 327.1, 328, 1, 423/328.2, 329.1
See application file for complete search history.

(56) References Cited

U.S. PATENT DOCUMENTS

| 3,755,538 | A | * | 8/1973 | Albers et al. ................... 423/710 |
| 5,928,623 | A |   | 7/1999 | Plee et al. |
| 6,264,881 | B1 |  | 7/2001 | Plee |
| 6,306,363 | B1 |  | 10/2001 | Funakoshi et al. |
| 6,596,256 | B1 | * | 7/2003 | Ojo et al. ....................... 423/700 |

FOREIGN PATENT DOCUMENTS

| EP | 0 818 418 | 1/1998 |
| EP | 0 960 854 | 12/1999 |
| FR | 2 766 475 | 1/1999 |

OTHER PUBLICATIONS

International Search Report for PCT/FR2008/052315 mailed Jul. 29, 2009.
Kühl, Crystallization of low-silica faujasite ($SiO_2/Al_2O_3$~2.0), Zeolites, Elsevier Science Publishing, US,1987, vol. 7, September, pp. 451-457.
Romero et al., "Synthesis of LSX zeolite by microwave heating", Materials Research Bulletin, Elsevier, Kidlington, GB, vol. 39, No. 3, 2004, pp. 389-400.

* cited by examiner

*Primary Examiner* — Holly Le
(74) *Attorney, Agent, or Firm* — Smith, Gambrell & Russell, LLP

(57) ABSTRACT

The invention relates to a zeolite of the faujasite X type having a low silica content, more precisely a zeolite LSX having a Si/Al atomic ratio lower than or equal to 1.15, having a high crystallinity rate and whereof the crystals have a controlled particle size distribution. The present invention also relates to the method for preparing said zeolite LSX.

17 Claims, No Drawings

METHOD OF MAKING LSX ZEOLITE OF CONTROLLED PARTICLE SIZE

The present invention relates to a faujasite X type having a low silica content, more precisely a zeolite LSX (acronym for "Low Silica X") type having a Si/Al atomic ratio lower than or equal to 1.15, having a high crystallinity rate and whereof the crystals have a narrow monomodal particle size distribution. The present invention also relates to the method of preparation, and particularly of industrial fabrication, of said zeolite LSX.

Faujasites constitute a group of mineral species characterized by their topographic crystallographic structure, which are described in particular in the work by Donald W. Breck "Zeolite Molecular Sieves", John Wiley and Sons, 1974—p. 92 et seq. The rule called the Lowenstein rule imposes on them a Si/Al ratio higher than or at least equal to 1. It is customary to distinguish:

faujasites X with Si/Al<1.5, and
faujasites Y with Si/Al>1.5.

Conventional faujasites X have a Si/Al ratio ≥1.2. Faujasites LSX (acronym for Low Silica X) or low silica faujasites are X type zeolitic species having a Si/Al atomic ratio lower than or equal to 1.15, preferably equal to 1±0.05 (values lower than 1 reflect the analytical uncertainties on the measurement of this ratio and the higher values, either the same analytical uncertainty, or a tolerable difference in purity of the product). This definition is used in the context of the present invention.

The physical properties of faujasites (exchange capacity, nitrogen adsorption, etc.) evolve according to the Si/Al ratio. LSX type faujasites are particularly advantageous due to the fact that, among all the faujasites that can be considered, they have the maximum possible tetrahedral aluminum ions per crystal lattice and, in consequence, potentially have the largest number of adsorption sites for a wide variety of molecules such as $CO_2$, $N_2$, etc.

In general, zeolites are prepared today, in particular X type and LSX type zeolites, by:

mixing a solution of alkali aluminate(s) with a solution of silicate(s) at a temperature between ambient temperature and a temperature lower than their boiling point;
gelling of the resulting mixture;
followed by maturation of the gel during which precursor seeds appear,
continued crystallization, which is a phase of crystal growth from these seeds.

The composition of the gel obtained from the aluminate(s)/silicate(s) mixture is an important parameter in the synthesis of zeolite. Thus, the prior art is rich in examples showing that slight variations in the composition of the synthetic gel or in the crystallization conditions can lead to zeolites of very different types and/or even amorphous compounds.

Another factor influencing crystal growth is stirring (or the absence thereof) of the synthesis medium independently of the composition of the solution or the crystallization gel.

Furthermore, in most preparation methods described for obtaining a large number of zeolites, a person skilled in the art strongly advises against the use of stirrers during the maturation step (crystal nucleation) and also during the zeolite crystallization step.

There is accordingly a split between two basically contradictory necessities: one is to stir to promote exchanges of material and heat and to prevent the syneresis of the crystals in formation; the other, on the contrary, is not to stir (static synthesis), to prevent the destabilization of the system and the appearance of undesired phases.

For example, D. E. W. Vaughan (*Chem. Engin. Progress*, 84(2), (1988), 25-31) shows that depending on the composition of the solution or of the crystallization gel, one is likely to see the appearance, either of a mixture of faujasite and gmelinite in static medium, or of zeolite P in a medium stirred by an anchor stirrer. In this case, a high shear rate generated by the anchor stirrer, located in only part of the synthesis medium, considerably modifies the process of germination and growth of the zeolite crystals, and their inherent nature, if the initial composition of the gel is the same as when the same synthesis is carried out without stirring (static).

R. M. Barrer (*Hydrothermal Chemistry of Zeolites*, in Academic Press, (1982), Chapter 4, point 5.6, pp. 170-171), observes, for zeolites normally being prepared in a stirred medium, such as faujasites, a drop in crystallinity when the speed of the stirrer and hence the local shear is increased.

For the reasons given above, many zeolite syntheses are carried out in static condition, that is without stirring, or with low stirring speed, in order to promote the slow growth of the crystals, and also the appearance and stabilization of zeolitic phases, which are not very stable from a thermodynamic viewpoint.

Moreover, it is well known to zeolite manufacturers that the transposition of certain syntheses from the laboratory scale to the industrial scale is difficult or even impossible from the economic standpoint, because it often leads to low zeolite yields and much lower crystallinity rates than those generally obtained in the laboratory (D. W. Breck, Zeolites Molecular Sieves, John Wiley and Sons, (1974), 727-731). The industrialization of these syntheses therefore demands a major change in the operating conditions before being able to obtain zeolites having a good crystallinity and in satisfactory economic conditions.

It is also known (G. H. Kühl, *Zeolites*, 7, (1987), 451-457) that the difficulties of synthesizing faujasites increase when their Si/Al atomic ratio decreases, and that conventional methods are bound to fail for the large scale preparation of LSX type faujasites. In particular, from a purely sodium medium, a mixture of zeolite NaA (generally in the majority) and zeolite NaX is obtained, and it is therefore necessary to introduce a certain quantity of potassium ions to synthesize the faujasite LSX structure; in this case, this is obtained for $Na/Na^+ K$ ratios in the synthesis gel of generally between 0.7 and 0.8.

The synthesis of faujasites LSX has been described for example in FR 2 357 482, GB 1 580 928 or by G. H. Kühl, (*Zeolites*, 7, (1987), 451-457): a mixture containing sodium hydroxide, potassium hydroxide, sodium aluminate and silicate, is crystallized without stirring at a temperature lower than 50° C., or matured without stirring at a temperature lower than 50° C. and then also crystallized without stirring at a temperature of 60° C. to 100° C. To obtain zeolite LSX with good crystallinity (typically higher than or equal to 90%), the total synthesis time is about 50 hours for an industrial type of synthesis carried out in a 3 $m^3$ reactor, which is unsatisfactory in terms of industrial profitability.

U.S. Pat. No. 4,859,217 describes a method in which a mixture containing sodium hydroxide, potassium hydroxide and alumina is mixed with a second solution containing sodium silicate. This mixture is allowed to gel at low temperature (4-12° C.), matured at 36° C. and then crystallized by increasing the temperature to 70° C. In this patent, the maturation step lasts 2 to 3 days and the crystallization step 16 hours, which also cannot be transposed to the industrial scale.

EP-A-0 818 418 describes a method for fabricating faujasite LSX in which the maturation and crystallization steps take place with stirring, using an Archimedes screw as a stirring means, a device well known to a person skilled in the art, described for example in the work "Ullmann's Encyclopedia of Industrial Chemistry", VCH (1988), volume B2, p. 25-5 et seq. In example 2, the zeolite LSX is obtained at the industrial scale with stirring (shear rate: 25 s$^{-1}$), with a maturation step at 50° C. for 20 hours, and a crystallization step at 90° C. for four hours. The zeolites obtained have excellent crystallinity (equal to or higher than 97%) and the size of the crystals (mean diameter measured by SEM) is 6 μm.

EP-B1-0 922 673 describes a method for synthesizing zeolite LSX in which the maturation step at a temperature between 0° C. at 60° C. takes place with stirring with the addition of a zeolite, preferably A type or faujasite type, during the maturation step. The faujasites LSX obtained have a bimodal particle size distribution with a first population of particles having a size distribution between 1 μm and 8μm, and another population of particles having a size distribution between 5 μm and 15 μm.

EP-B1-0 960 854 describes a method for synthesizing zeolite LSX in which the maturation step at a temperature of between 0° C. and 60° C. takes place with stirring with the addition, after gelling and/or during the maturation step, of 0.3% up to 10% of a solution having the composition 10-20 Na$_2$O; Al$_2$O$_3$; 5-20 SiO$_2$; 100-250 H$_2$O, previously matured, at a temperature of between 10° C. and 60° C., for a period of between 10 minutes and 3 hours. It is described that the faujasites LSX are obtained with a main particle size distribution, implying the presence of other population(s) having different particle size distributions.

The present inventors have now sought to obtain zeolite LSX having controlled crystallinity and particle size distribution properties, and also a preparation method, adapted in particular to industrial production, designed to obtain the zeolites. Thus, the present invention relates to zeolites having controlled crystallinity and particle size distribution properties, and a method for synthesizing zeolite LSX serving to improve the method of formation and quality of the crystals of said zeolites.

Thus, according to a first aspect, the invention proposes a LSX type zeolite having a Si/Al atomic ratio lower than or equal to 1.15, preferably equal to 1±0.05, in the form of individualized crystals whereof:
- the particle size distribution determined by SEM counting is monomodal, with a peak width (2σ) lower than 8, preferably lower than 6, even more preferably lower than 4, and ideally lower than 2; and
- the mean number diameter measured by scanning electron microscope is higher than 0.1 μm and lower than 10 μm, preferably lower than 4 μm, even more preferably lower than 3 μm.

The term "monomodal" distribution is understood to mean a distribution that is not significantly different from the log-normal law at 1% significance level, log-normal law applied to the statistical results from the χ$^2$ (Chi$^2$) test (software used "Statistica" from StatSoft France). More specifically, the expression "distribution that is not significantly different from the log-normal law at 1% significance level" is understood to mean that the significance level "p" of the Chi$^2$ test is greater than or equal to 1%, preferably greater than or equal to 5%, more preferably greater than or equal to 8%.

The zeolites of the invention have a narrow monomodal particle size distribution, thereby ensuring uniformity of crystal size, and in consequence, optimal, because controlled, characteristics.

The zeolite of the present invention also has a crystallinity rate higher than 88%, advantageously higher than 90%, preferably higher than 93%, and even more preferably higher than 95%.

In the present specification and claims, the particle size distribution is determined by analysis of SEM (scanning electron microscope) images. The image analysis process for determining the size distribution of the crystals consists of a visual count of all the crystals appearing in an SEM image containing at least 100 crystals. The size determined for each crystal is that of the largest cross section of said crystal concerned.

The counting operation is performed on at least two images, the resulting particle size distribution being the mean of the particle size distributions observed in each of the images. The peak width and mean number diameter are calculated by conventional methods known to a person skilled in the art, applying the statistical rules of Gaussian distribution.

The crystallinity rate is determined by measuring the Dubinin volume, which is an estimate of the microporous volume measured by nitrogen adsorption at 77 K, related to a faujasite having a Dubinin volume of 0.325 cm$^3$/g taken for reference at 100% crystallinity.

The Dubinin volume is calculated from the Dubinin-Radushkevich equation, as described by Lowell et al in "Characterization of Porous Solids and Powders: Surface Area, Pore Size and Density", chapter 9, "Micropore Analysis", pages 143-145, reproduced below:

$$\log V = \log V_0 - D\left(\log \frac{P}{P_0}\right)^2$$

which relates the volume V of nitrogen adsorbed on the adsorbent material at the gauge pressure P/P$_0$. The Dubinin volume is the volume V$_0$, maximum volume of nitrogen vapor that can be condensed in the micropores of the adsorbent material. It is expressed in cm$^3$ of nitrogen vapor (related to standard conditions) per gram of adsorbent.

Prior to the measurement, the sample is pretreated at 500° C. for 12 hours under vacuum (P<5.10$^{-6}$ Torr; or 6.7.10$^{-4}$ Pa). The measurement is then taken on a Micromeritics ASAP 2010 M type apparatus. The adsorbate gas used is nitrogen. The isotherm is plotted using a pressure table of at least 35 points between 0.01 and 1 P/P$_0$. The value of log V is plotted on a diagram as a function of (log(P/P$_0$))$^2$. The Dubinin volume is obtained from the x-axis at the origin of the linear regression line of the points of which (log(P/P$_0$))$^2$ is between 1 and 2 (or 0.039<P/P$_0$<0.1). The measurement uncertainty is ±0.003.

According to another aspect, the present invention relates to a method for preparing zeolite LSX, said method serving to stabilize certain highly unstable zeolitic phases more easily, including when the reaction is performed in static conditions (that is, in unstirred medium), to improve the quantitative synthesis yields, and to guarantee a high crystallinity rate of the zeolites. Furthermore, the inventive method serves to effectively control the particle size distribution of the LSX crystals. Moreover, the method of the invention is more easily transposable to the industrial scale.

Thus, the present invention relates to a method for preparing a zeolite LSX, having a Si/Al atomic ratio lower than or equal to 1.15, preferably equal to 1±0.05, and whereof the particle size distribution is monomodal and between 0.1 μm and 10 μm, preferably between 0.1 μm and 4 μm, even more preferably between 0.1 μm and 3 μm, by maturation and crystallization of a gel of which the molar composition satisfy the following conditions:

$Na_2O/(Na_2O+K_2O)$ ratio of 0.75 to 1, preferably 0.75 to 0.8;

$H_2O/Al_2O_3$ of 60 to 85, preferably 65 to 80, and even more preferably 70 to 80;

$SiO_2/Al_2O_3$ of 1.8 to 2.2;

$(Na_2O+K_2O)/Al_2O_3$, of 4.8 to 6, preferably 5 to 5.5.

The method according to the invention is suitable for obtaining zeolite crystals of faujasite LSX type having a clearly defined and uniform shape, that is, substantially free of agglomerate of undefined shape and whereof the particle size distribution determined is monomodal, with a peak width (2σ) lower than 8, preferably lower than 6, even more preferably lower than 4, and ideally lower than 2.

According to an absolutely preferred embodiment, 80% of the crystals of this monomodal particle size distribution are between 1 μm and 4 μm, preferably between 1 μm and 3 μm. The particle size distribution is determined by SEM counting, as indicated previously.

Furthermore, the method according to the invention is suitable for obtaining quantitative, or at least virtually quantitative crystallization yields, in comparison with the yields obtained with the synthesis methods known to a person skilled in the art, whether carried out in static or stirred medium. The method according to the invention is also easily transposable to the industrial scale, as indicated above, and particularly due to the features described below.

Thus the method of the present invention firstly uses a mixture of a solution of alkali aluminate(s), with a source of silica, preferably a colloidal silica or a solution of alkali silicate(s), and sodium hydroxide and potassium hydroxide, until gelling of the resulting mixture.

This initial mixture is prepared by conventional techniques known to a person skilled in the art, with solutions of appropriate raw materials known in the field, provided that the above-mentioned molar ratios are satisfied, and as recalled below:

$Na_2O/(Na_2O+K_2O)$ ratio of 0.75 to 1, preferably 0.75 to 0.8;

$H_2O/Al_2O_3$ of 60 to 85, preferably 65 to 80, and even more preferably 70 to 80;

$SiO_2/Al_2O_3$ of 1.8 to 2.2;

$(Na_2O+K_2O)/Al_2O_3$, of 4.8 to 6, preferably 5 to 5.5.

The order of introduction of the various raw materials is immaterial; the solution of alkali aluminate(s) can be introduced into the synthesis reactor, followed by the silica source. According to an alternative, the silica source is introduced into the reactor, and the alkali aluminate(s) solution is then added. According to yet another alternative, the silica source and the solution of alkali aluminate(s) are introduced simultaneously into the reactor.

The potassium hydroxide solution can be introduced either in the silica source or in the alkali aluminate(s) solution, or even both in the silica source and in the alkali aluminate(s) solution.

In a particular embodiment, a seed can also be introduced into the initial mixture. When it is present, this is preferably previously mixed with the solution of alkali aluminate(s) and/or the source of silica, before introduction into the reaction medium. As an alternative, the seed may be introduced into the reaction medium during the gelling and/or at the start of the gel maturation step.

The seed is advantageously selected from seeds commonly used in the field, and for example from zeolites, clays and nucleating solutions based on silica and alumina, whether they are in gel form or not.

The seed is generally added in a quantity of between 0.01% and 1.5% by weight, preferably between 0.01% and 1% by weight of the weight of the initial mixture.

The mixture of the various raw materials indicated above must allow the most uniform possible mixing, and for this purpose, it is advantageous to use adapted mixtures known in the field, such as for example a deflocculating turbine or Archimedes screw. Any other type of mixer/stirrer can be used to obtain a homogenous gel.

After mixing of the various raw materials, optionally in the presence of one or more seeds, a gel is formed (gelling), said gel then being engaged in a maturation step.

According to the inventive method, the maturation is carried out with stirring, generally with strong stirring, with a shear rate higher than $25\ s^{-1}$, preferably higher than $50\ s^{-1}$, even more preferably higher than $100\ s^{-1}$, and ideally higher than $125\ s^{-1}$.

This stirring can be provided by any means known per se, with the understanding that the shear rate indicated above must be satisfied. According to an advantageous embodiment, the stirring is provided by means of an axial and/or radial stirrer, preferably selected from a propeller stirrer, paddle stirrer for example of the "impeller" type or curved paddle stirrer, and Archimedes screw. Preferably, the stirring is provided by an Archimedes screw, as described for example in patent application EP-A-0 818 048.

It has been observed that stirring with a shear rate higher than $25\ s^{-1}$, preferably higher than $50\ s^{-1}$, even more preferably higher than $100\ s^{-1}$, and ideally higher than $125\ s^{-1}$, allows optimal maturation of the gel, and the production of zeolite with the desired characteristics. There is no upper limit to the recommended shear rate, unless it is opposed by the mechanical characteristics of the stirrer employed.

Stirring during maturation also serves to overcome the drawbacks commonly encountered during conventional zeolite preparations, particularly faujasites X with low silica content, in particular when the maturation step is carried out in static conditions.

In fact, during syntheses of zeolites in static medium, the seeds appear randomly in the synthesis medium, that is, in unpredictable locations and at different times, giving rise to broad and unreproducible crystal particle size distributions and the presence of several intermediate crystalline or amorphous phases.

The maturation of the gel defined above is generally carried out at a temperature of between 0° and 80° C., preferably between 30° C. and 70° C. A temperature lower than 0° C. may cause an undesired slowing of the maturation step, which could have a negative impact on profitability. A temperature higher than 80° C. may be considered, but would incur prohibitive production costs.

The maturation of the gel is thus advantageously carried out at a preferred temperature of between 30° C. and 70° C., for a period of between 0.5 hour and 40 hours, preferably between 5 hours and 30 hours, and even more preferably between 10 hours and 24 hours.

After this maturation step, the reaction medium is engaged in a crystallization step. This is advantageously carried out at a temperature of between 50° C. and 100° C., for a period of between 0.5 hour to 10 hours, preferably between 1 hour and 5 hours.

The crystallization can be carried out in static conditions or with stirring. When the crystallization is carried out with stirring, this may be of any type, and preferably with a shear rate higher than 25 s$^{-1}$, preferably higher than 50 s$^{-1}$, even more preferably higher than 100 s$^{-1}$, and ideally higher than 125 s$^{-1}$. For example, the stirring of the crystallization medium is carried out under the same stirring conditions (stirrer, shear rate) as those used in the maturation step.

The method according to the present invention has the advantage of considerably shortening the total duration of the industrial manufacturing process, with maturations between 0° C. and 80° C., preferably between 30° C. and about 70° C., taking place over periods of 0.5 to 40 hours, and crystallizations at 50-100° C. for 0.5 to 10 hours. Various combinations of alternatives of the maturation and crystallization steps defined above are feasible, and all these alternatives belong to the present invention.

Upon completion of the crystallization, the zeolite obtained is recovered by conventional techniques known to a person skilled in the art, such as filtration, washing, drying and other.

Contrary to the various known methods of the prior art, the overall method according to the present invention has another advantage, of being suitable to be carried out at atmospheric pressure and with shorter durations, particularly for crystallization, thereby allowing the synthesis of zeolites LSX with controlled crystallinity and particle size distribution.

The present invention is now described with the help of the following examples, for the purpose of illustrating certain embodiments of the invention, but without limiting the scope of said invention, as claimed in the appended claims.

EXAMPLE 1

Laboratory Scale Synthesis of Zeolite LSX

Step a): Preparation of the Gel.
1) Solution 1 of sodium and potassium aluminate:
   Deionized water: 800 g
   Sodium hydroxide (99% pure): 420 g
   Potassium hydroxide (K$_2$O purity: 85%): 255 g
   This solution is heated to 115° C. and 240 g of aluminum hydroxide is then added.
2) Solution 2 of sodium silicate:
   Deionized water: 620 g
   Sodium silicate: 710 g
   Solutions 1 and 2 are mixed in a 3 L reactor using a deflocculating turbine at 2000 rpm for 5 minutes to obtain a homogenous gel. This composition corresponds to the following stoichiometry:
   3.95 Na$_2$O:1.26 K$_2$O:2 Si$_2$O:1 Al$_2$O$_3$:77.4 H$_2$O After mixing of the reagents and gelling, the gel is then matured for 18 hours at 50° C., and crystallization is then carried out for 4 hours at 95° C., maturation and crystallization being carried out under the same stirring conditions, which have been varied, as shown in the table below. As a variant, the crystallization is carried out under different stirring conditions (higher or lower shear rate), or even under static conditions (without stirring, zero shear rate).

The crystals obtained after filtration, washing and drying are identified by X-ray diffraction as being faujasite type zeolite. The chemical analysis of the solid yields a Si/Al ratio=1.01.

The results obtained (cf. Table 1) are expressed in crystallinity values measured by their Dubinin volume, which is an estimate of the microporous, measured by nitrogen adsorption at 77K, related to that of a LSX taken for reference at 100% crystallinity, equal to 0.325 cm$^3$/g (theoretical calculation).

TABLE 1

| Stirring mode | Stirring speed rpm | Shear rate s$^{-1}$ | Dubinin volume cm$^3$/g | Crystallinity |
|---|---|---|---|---|
| Static | 0 | 0 | 0.310 | 95% |
| Impeller | 50 | 27 | 0.301 | 93% |
|  | 250 | 135 | 0.300 | 92% |
| Archimedes screw | 50 | 26 | 0.304 | 93.5% |
|  | 200 | 100 | 0.308 | 94.8% |
|  | 250 | 130 | 0.311 | 96% |
|  | 250* | 130* | 0.312 | 96.5% |

*speed and shear rate for the maturing step, the crystallization step being carried out under static conditions (without stirring, zero shear rate).

It is found that under identical maturation crystallization conditions, the passage of the synthesis from the static medium to a stirred medium using an "impeller" or Archimedes screw stirrer, does not cause any real loss of crystallinity.

The use of the Archimedes screw as a mixing tool serves to obtain a powder with very good crystallinity (higher than 95%) even at high shear rates.

The analysis of the product obtained by scanning electron microscope (SEM) serves to determine the particle size distribution of the crystals and to measure the mean number diameter. The results are given in Table 2 below:

TABLE 2

| Stirring mode | Stirring speed rpm | Shear rate s$^{-1}$ | Particle size distribution | P (%) | D$_{50}$ | 2σ |
|---|---|---|---|---|---|---|
| Static | 0 | 0 | Pseudo-Gaussian 0.1 μm and 11 μm | 0 | 5.6 | 11.6 |
| Impeller | 50 | 27 | Monomodal | 4 | 2.3 | 2.8 |
|  | 250 | 135 | Monomodal | 15 | 1.3 | 1.2 |
| Archimedes screw | 50 | 26 | Monomodal | 8 | 3.9 | 5.1 |
|  | 200 | 100 | Monomodal | 45 | 2.6 | 2.8 |
|  | 250 | 130 | Monomodal | 51 | 2.2 | 2.6 |
|  | 250* | 130* | Monomodal | 42 | 2.4 | 2.8 |

*speed and shear rate for the maturing step, the crystallization step being carried out under static conditions (without stirring, zero shear rate).

It is found that the passage from a static medium during maturation and crystallization to a stirred medium during the same steps serves to obtain zeolite crystals having a narrower monomodal Gaussian particle size distribution and having a mean number diameter lower than 4 μm, with shear rates higher than 25 s$^{-1}$.

EXAMPLE 2

Synthesis Using a LSX Type Seed

The conditions of example 1 above are reproduced, with the exception that just before the mixing operation in the 3 L reactor, a percentage of LSX powder (percentage by weight of anhydrous product with regard to the total weight of the starting gel) is added to the aluminate solution 1. The addition is made with stirring, with various shear rates as indicated in the table below.

It is found that the addition of a LSX zeolite powder as seed in a quantity by weight lower than 1% serves to obtain a LSX zeolite with very high purity, for shear rates above 25 s$^{-1}$.

The crystallinity and particle size distribution results are given in Tables 3 and 4 below:

TABLE 3

| Stirring Mode | Shear rate s$^{-1}$ | % seed | Dubinin volume cm$^3$/g | Crystallinity |
|---|---|---|---|---|
| Archimedes screw | 26 | 0.25 | 0..312 | 96% |
| | 130 | 0.25 | 0.311 | 96% |
| | 130 | 1 | 0.295 | 90% |

TABLE 4

| Stirring Mode | Shear rate s$^{-1}$ | % seed | Particle size distribution | P (%) | D$_{50}$ | 2σ |
|---|---|---|---|---|---|---|
| Archimedes screw | 26 | 0.25 | Monomodal | 31 | 3.0 | 5 |
| | 130 | 0.25 | Monomodal | 64 | 2.8 | 4 |
| | 130 | 1 | Monomodal | 66 | 1.5 | 1.4 |

EXAMPLE 3

Industrial Scale Synthesis of Zeolite LSX

The reagents are prepared as in Example 1, and the figures, previously expressed in grams, are expressed in kilograms. A 3 m$^3$ reactor is used, equipped with an Archimedes screw.

The synthesis method is then carried out under the same conditions (shear rate, temperature, time) as those given in Example 1.

The zeolite obtained has characteristics perfectly similar to those obtained in Example 1.

The invention claimed is:

1. A method for preparing a LSX type zeolite having a Si/Al atomic ratio lower than or equal to 1.15 in the form of crystals whereof: the particle size distribution determined by SEM counting is monomodal, with a peak width (2σ) lower than 8; and the mean number diameter measured by scanning electron microscope is higher than 0.1 μm and lower than 10 μm, which comprises:
  at least one step of maturation with stirring and one step of crystallization optionally with stirring of a gel of which the molar composition satisfies the following conditions: Na$_2$O/(Na$_2$O+K$_2$O) ratio of 0.75 to 1; SiO$_2$/Al$_2$O$_3$ of 1.8 to 2.2; (Na$_2$O+K$_2$O)/Al$_2$O$_3$, of 4.8 to 6; H$_2$O/Al$_2$O$_3$ of 60-85, wherein the maturation is carried out with stirring with a shear rate higher than 25 s$^{-1}$.

2. The method as claimed in claim 1, wherein the LSX type zeolite has a crystallinity rate higher than 88%.

3. The method as claimed in claim 1, wherein the stirring is performed with an axial and/or radial stirrer.

4. The method as claimed in claim 1, wherein the maturation is carried out at a temperature between 0° C. and 80° C.

5. The method as claimed claim 1, which comprises the following steps:
  a) mixing of a solution of alkali aluminate(s), with a source of silica and sodium hydroxide and potassium hydroxide, until gelling of the resulting mixture;
  b) maturation of said gel with stirring, at a temperature between 0° C. and 80° C. for a period of between 0.5 hour and 40 hours;
  c) crystallization, optionally with stirring, at a temperature of between 50° C. and 100° C., for a period of between 0.5 hour and 10 hours.

6. The method as claimed in claim 5, wherein the crystallization is carried out with a shear rate higher than 25 s$^{-1}$.

7. The method as claimed in claim 5, wherein the crystallization is carried out with stirring with an axial and/or radial stirrer.

8. The method as claimed in claim 5, wherein a seed, in a quantity of between 0.01% and 1.5% by weight of the weight of the final mixture, is added, in parts or in full, in one or more of the following steps of said method: in the mixture of step a); during the gelling; and/or at the start of maturation.

9. The method as claimed in claim 5, wherein the seed is selected from zeolites, clays and nucleating solutions based on silica and alumina.

10. The method as claimed in claim 1, wherein the Si/Al atomic ratio is equal to 1±0.05.

11. The method as claimed in claim 1, wherein the particle size distribution is lower than 6.

12. The method as claimed in claim 1, wherein the particle size distribution is lower than 4.

13. The method as claimed in claim 1, wherein the particle size distribution is lower than 2.

14. The method as claimed in claim 1, wherein the mean number diameter is lower than 4 μm.

15. The method as claimed in claim 1, wherein the mean number diameter is lower than 3 μm.

16. A method for preparing a LSX type zeolite having a Si/Al atomic ratio lower than or equal to 1.15 in the form of crystals whereof: the particle size distribution determined by SEM counting is monomodal, with a peak width (2σ) lower than 8; and the mean number diameter measured by scanning electron microscope is higher than 0.1 μm and lower than 10 μm, which comprises:
  providing an initial mixture of alkali aluminate(s), with a source of silica and sodium hydroxide and potassium hydroxide, having a molar composition satisfying the following conditions: Na$_2$O/(Na$_2$O+K$_2$O) ratio of 0.75 to 1; SiO$_2$/Al$_2$O$_3$ of 1.8 to 2.2; (Na$_2$O+K$_2$O)/Al$_2$O$_3$, of 4.8 to 6; H$_2$O/Al$_2$O$_3$ of 60-85;
  mixing the initial mixture to form a gel;
  maturing the gel at a temperature between 30° C. and 70° C. for a period of between 0.5 hour and 40 hours with stirring at a shear rate higher than 25 s$^1$;
  crystallizing, optionally with stirring, at a temperature of between 50° C. and 100° C., for a period of between 0.5 hour and 10 hours, and
  wherein the steps of mixing, maturation, and crystallizing are carried out at atmospheric pressure.

17. The method as claimed in claim 16, wherein the LSX type zeolite has a crystallinity rate that is higher than 88%.

* * * * *